(12) United States Patent
Kuzuyama

(10) Patent No.: US 8,036,855 B2
(45) Date of Patent: Oct. 11, 2011

(54) FAILURE DIAGNOSIS APPARATUS FOR HOMOGENEOUS CHARGE COMPRESSION IGNITION ENGINE

(75) Inventor: Hiroshi Kuzuyama, Kariya (JP)

(73) Assignee: Kabushiki Kaisha Toyota Jidoshokki, Aichi-ken (JP)

(*) Notice: Subject to any disclaimer, the term of this patent is extended or adjusted under 35 U.S.C. 154(b) by 378 days.

(21) Appl. No.: 12/287,569

(22) Filed: Oct. 10, 2008

(65) Prior Publication Data

US 2009/0099816 A1 Apr. 16, 2009

(30) Foreign Application Priority Data

Oct. 10, 2007 (JP) ................................ 2007-264542
Oct. 8, 2008 (JP) ................................ 2008-261766

(51) Int. Cl.
*G06F 11/30* (2006.01)

(52) U.S. Cl. ........ 702/183; 702/185; 702/189; 702/193; 123/308; 123/432; 123/568.17

(58) Field of Classification Search .................. 702/100, 702/183, 189
See application file for complete search history.

(56) References Cited

U.S. PATENT DOCUMENTS

| | | | |
|---|---|---|---|
| 6,619,245 B1* | 9/2003 | Fujiwara et al. | 123/90.11 |
| 6,840,237 B2* | 1/2005 | Strom et al. | 123/684 |
| 7,367,319 B2* | 5/2008 | Kuo et al. | 123/435 |
| 7,971,564 B2* | 7/2011 | Kuzuyama et al. | 123/184.21 |
| 2003/0061803 A1* | 4/2003 | Iihoshi et al. | 60/285 |
| 2003/0106520 A1* | 6/2003 | Fiveland et al. | 123/294 |

FOREIGN PATENT DOCUMENTS

| | | |
|---|---|---|
| JP | 3-9010 | 1/1991 |
| JP | 6-317117 | 11/1994 |
| JP | 2005-315126 | 11/2005 |

* cited by examiner

*Primary Examiner* — Drew A Dunn
*Assistant Examiner* — Mischita Henson
(74) *Attorney, Agent, or Firm* — Locke Lord Bissell & Liddell LLP

(57) ABSTRACT

A failure diagnosis apparatus for a homogeneous charge compression ignition engine having combustion modes switchable between HCCI combustion, performed together with internal EGR, and SI combustion. The engine includes an intake variable valve mechanism and an exhaust variable valve mechanism. The apparatus includes an airflow meter detecting an intake amount of mixture drawn into a combustion chamber of the engine and a control computer determining whether a failure has occurred in the intake variable valve mechanism and the exhaust variable valve mechanism from intake amount change information. The control computer determines whether a failure has occurred based on information on switching from SI combustion to HCCI combustion, intake amount change information, and predetermined first reference change information, and determines whether a failure has occurred based on information on switching from HCCI combustion to SI combustion, intake amount change information, and predetermined second reference change information.

12 Claims, 7 Drawing Sheets

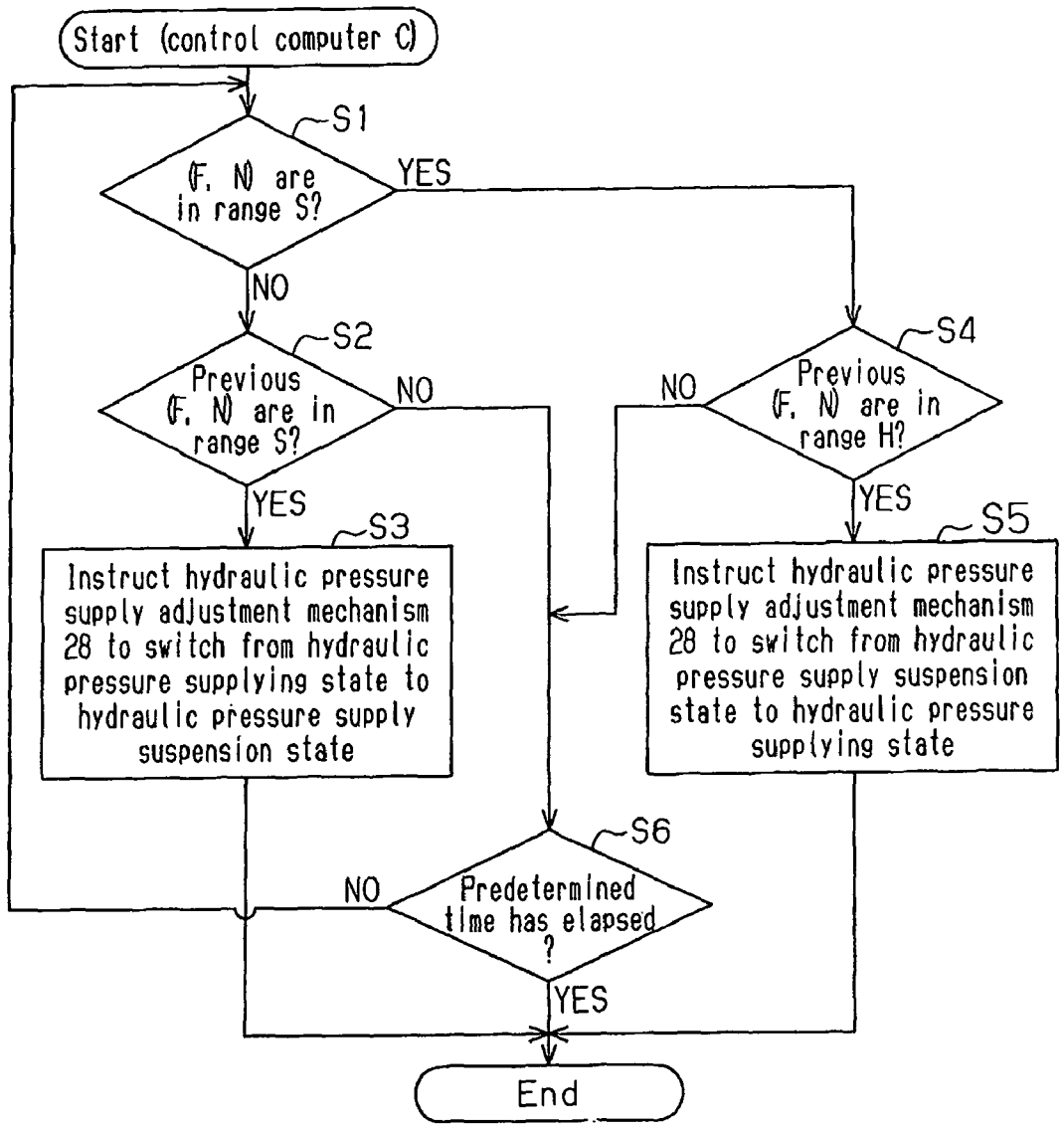

FAILURE DIAGNOSIS APPARATUS FOR HOMOGENEOUS CHARGE COMPRESSION IGNITION ENGINE

BACKGROUND OF THE INVENTION

The present invention relates to a failure diagnosis apparatus for a homogeneous charge compression ignition engine that compresses and ignites a mixture of fuel and air in a combustion chamber.

Japanese Laid-Open Patent Publication Nos. 3-9010 and 6-317117 each describe a variable valve timing mechanism, which varies the valve timing of an intake valve or an exhaust valve according to the driving state of an internal combustion engine. When a failure occurs in a variable valve timing mechanism of an internal combustion engine, the actual valve timing may differ from the target valve timing and thereby lower the driving performance of the engine.

The above publications each describe an apparatus for diagnosing a variable valve timing mechanism to determine whether a failure has occurred in the mechanism. The apparatus described in Japanese Laid-Open Patent Publication No. 3-9010 determines whether a failure has occurred in the variable valve timing mechanism based on a valve timing varying signal and a detected intake amount.

The apparatus described in Japanese Laid-Open Patent Publication No. 6-317117 determines whether a failure has occurred in the variable valve timing mechanism based on the pulsation level of intake air detected by an intake air pulsation detector and a predetermined pulsation level corresponding to each driving condition of the internal combustion engine.

A homogeneous charge compression ignition (HCCI) engine generates a small amount of NOx and practically no soot. However, an HCCI engine may experience misfiring and knocking more frequently than a spark-ignition internal combustion engine. Japanese Laid-Open Patent Publication No. 2005-315126 describes an HCCI engine that assists homogeneous charge compression ignition using the heat of the exhaust gas by performing spark ignition or internal exhaust gas recirculation (EGR) when necessary. The internal EGR keeps exhaust gas in a combustion chamber or re-circulates exhaust gas into the combustion chamber. The engine described in Japanese Laid-Open Patent Publication No. 2005-315126 performs both homogeneous charge compression ignition and spark ignition, which have different optimum valve timing settings. Therefore, the engine described in Japanese Laid-Open Patent Publication No. 2005-315126 needs a variable valve timing mechanism.

However, Japanese Laid-Open Patent Publication Nos. 3-9010 and 6-317117 do not describe a failure diagnosis for an HCCI engine that performs both homogeneous charge compression ignition and spark ignition.

SUMMARY OF THE INVENTION

It is an object of the present invention to provide a failure diagnosis apparatus optimal for use with a homogeneous charge compression ignition engine that performs internal EGR using an intake variable valve mechanism and an exhaust variable valve mechanism.

To achieve the above object, one aspect of the present invention is a failure diagnosis apparatus for a homogeneous charge compression ignition engine having combustion modes switchable between compression-ignited combustion, which is performed together with internal EGR, and spark-ignited combustion. The engine includes an intake variable valve mechanism for varying an operation state of an intake valve and an exhaust variable valve mechanism for varying an operation state of an exhaust valve. The apparatus includes an intake amount detector which detects the intake amount of a mixture drawn into a combustion chamber of the engine. A determination unit determines whether a failure has occurred in the intake variable valve mechanism and the exhaust variable valve mechanism from information on changes in the intake amount detected by the intake amount detector. The determination unit determines whether a failure has occurred from information on switching from the spark-ignited combustion to the compression-ignited combustion, information on changes in the intake amount, and predetermined first reference change information. Further, the determination unit determines whether a failure has occurred from information on switching from the compression-ignited combustion to the spark-ignited combustion, information on changes in the intake amount, and predetermined second reference change information.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a flowchart illustrating a switch control program; and

DETAILED DESCRIPTION OF THE PREFERRED EMBODIMENTS

A preferred embodiment of a failure diagnosis apparatus for a stationary type homogeneous charge compression ignition (HCCI) according to the present invention will now be discussed with reference to FIGS. 1 to 8.

Figure 1A:
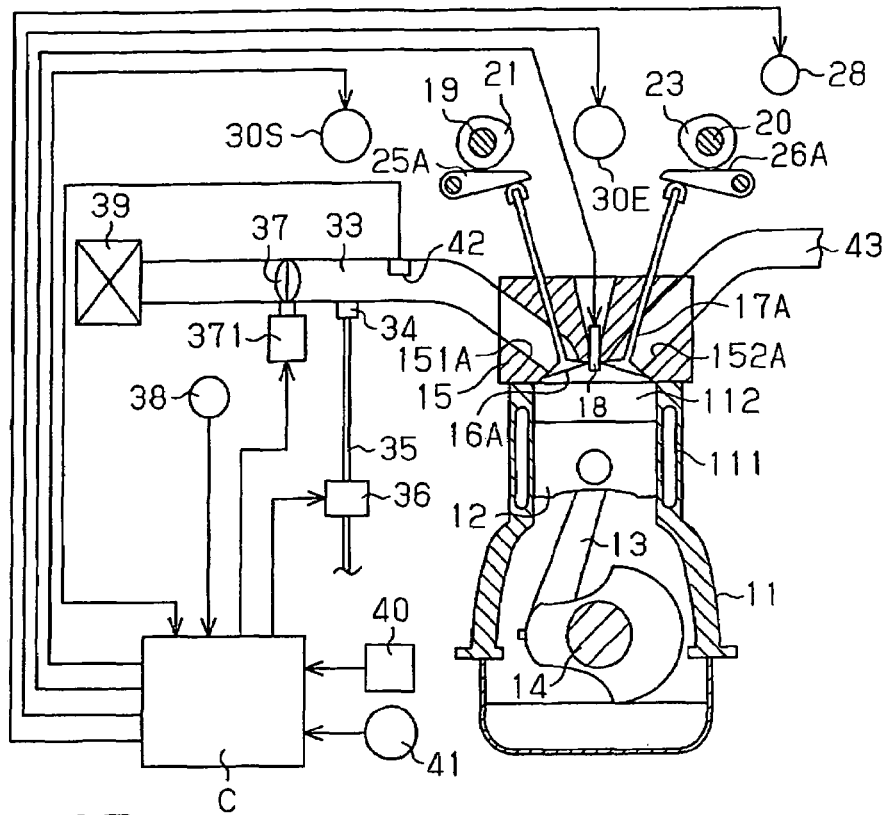
FIGS. 1A and 1B are schematic diagrams showing a preferred embodiment of a failure diagnosis apparatus for an HCCI engine according to the present invention.
Figure 1B:
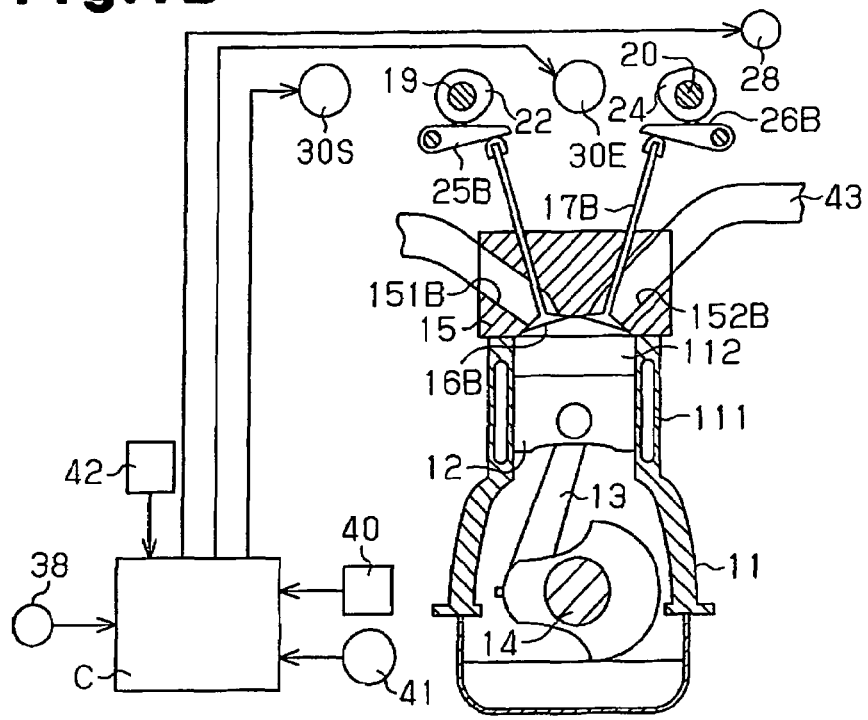

As shown in FIGS. 1A and 1B, a cylinder block 11 includes a plurality of cylinders 111 (only one shown). A piston 12 reciprocates in each cylinder 111. The piston 12 defines a combustion chamber 112 in the cylinder 111. The piston 12 is connected to a crankshaft 14 by a connecting rod 13. Reciprocation of the piston 12 is converted to rotation of the crankshaft 14 by the connecting rod 13. Although a plurality of the cylinders 111 are arranged in series in the axial direction of the crankshaft 14, only one will be described hereafter.

A cylinder head 15 is mounted on the cylinder block 11. The cylinder head 15 includes two intake ports 151A and 151B and two exhaust ports 152A and 152B. Intake valves 16A and 16B, which are arranged on the cylinder head 15, respectively open and close the intake ports 151A and 151B. Exhaust valves 17A and 17B, which are arranged on the cylinder head 15, respectively open and close the exhaust ports 152A and 152B. An exhaust passage 43 is connected to the exhaust ports 152A and 152B.

A spark plug 18 is arranged in the cylinder head 15 facing toward the combustion chamber 112. The spark plug 18 generates sparks (is ignited) in the combustion chamber 112. A control computer C controls the ignition of the spark plug 18.

Figure 2A:
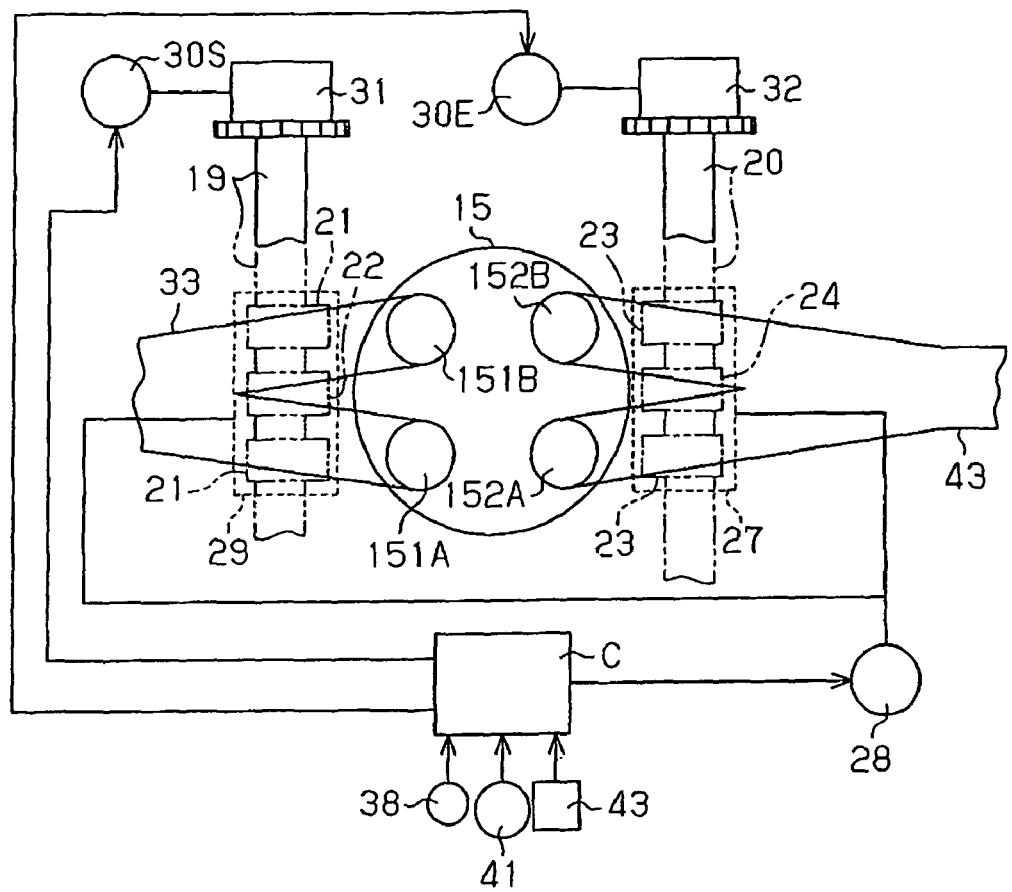
FIG. 2A is a partial plan view of the failure diagnosis apparatus shown in FIGS. 1A and 1B.

As shown in FIG. 2A, an intake camshaft 19 and an exhaust camshaft 20 are arranged above the cylinder head 15. The intake camshaft 19 includes two low-lift intake cams 21 and one high-lift intake cam 22. The exhaust camshaft 20 includes two low-lift exhaust cams 23 and one high-lift exhaust cam 24. The low-lift intake cams 21 drive low-lift intake cam levers 25A shown in FIG. 1A. The high-lift intake cam 22 drives a high-lift intake cam lever 25B shown in FIG. 1B. The low-lift exhaust cams 23 drive low-lift exhaust cam levers 26A shown in FIG. 1A. The high-lift exhaust cam 24 drives a high-lift exhaust cam lever 26B shown in FIG. 1B.

Figure 2B:
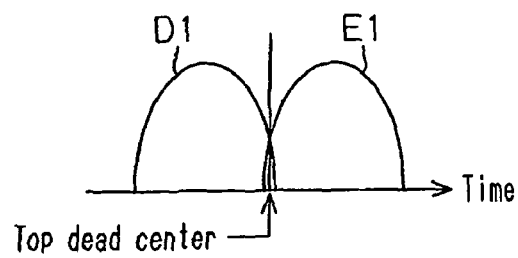
FIG. 2B is a timing chart showing the operation state of an exhaust valve and an intake valve of the engine shown in FIGS. 1A and 1B when the engine performs SI combustion.
Figure 3:
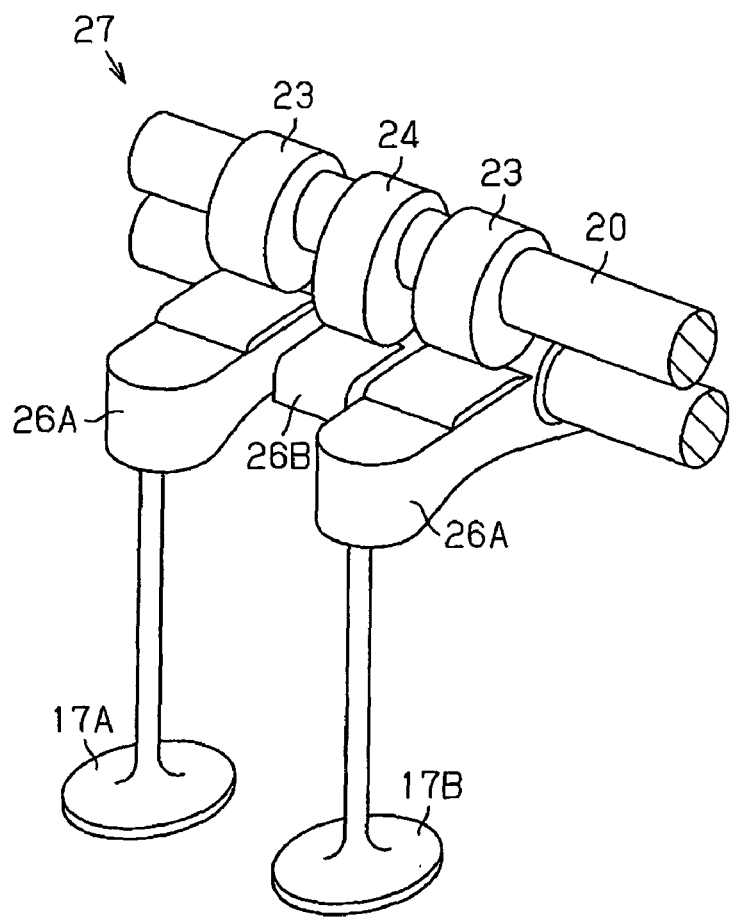
FIG. 3 is a perspective diagram of an exhaust variable valve mechanism in the engine shown in FIGS. 1A and 1B.

FIG. 3 shows an exhaust variable valve mechanism 27, which includes the exhaust camshaft 20, the low-lift exhaust cams 23, the high-lift exhaust cam 24, the high-lift exhaust cam lever 26B, and the low-lift exhaust cam levers 26A. The high-lift exhaust cam lever 26B can be disconnected from the low-lift exhaust cam levers 26A. The exhaust variable valve mechanism 27 can be supplied with hydraulic pressure from a hydraulic pressure supply adjustment mechanism 28 (refer to FIGS. 1A and 1B). When the exhaust variable valve mechanism 27 is supplied with hydraulic pressure from the hydraulic pressure supply adjustment mechanism 28, the high-lift exhaust cam lever 26B is connected to the low-lift exhaust cam levers 26A. As a result, the high-lift exhaust cam lever 26B is driven by the high-lift exhaust cam 24. In FIG. 2B, curve D1 indicates one example of the operation state of the exhaust valves 17A and 17B when the high-lift exhaust cam lever 26B is driven in a state in which the high-lift exhaust cam lever 26B is connected to the low-lift exhaust cam levers 26A. In detail, curve D1 indicates changes in the valve lift amount from the opening timing to the closing timing of the exhaust valves 17A and 17B. A state in which hydraulic pressure is supplied from the hydraulic pressure supply adjustment mechanism 28 to the exhaust variable valve mechanism 27 corresponds to a first exhaust operation state in which movement of the high-lift exhaust cam 24 for spark ignition (SI) combustion is transmitted to the exhaust valves 17A and 17B.

Figure 2C:
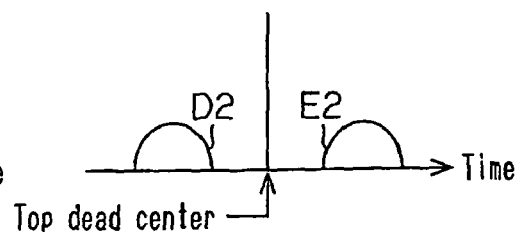
FIG. 2C is a timing chart showing the operation state of the exhaust valve and the intake-valve of the engine shown in FIGS. 1A and 1B when the engine performs HCCI combustion.

When the supply of hydraulic pressure from the hydraulic pressure supply adjustment mechanism 28 to the exhaust variable valve mechanism 27 is stopped, the high-lift exhaust cam lever 26B is disconnected from the low-lift exhaust cam levers 26A. As a result, the high-lift exhaust cam lever 26B becomes free, and the low-lift exhaust cam levers 26A are driven by the low-lift exhaust cams 23. In FIG. 2C, curve D2 indicates one example of the operation state of the exhaust valves 17A and 17B (changes in the valve lift amount from the opening timing to the closing timing) when the low-lift exhaust cam levers 26A are driven in a state in which the high-lift exhaust cam lever 26B is disconnected from the low-lift exhaust cam levers 26A. A state in which hydraulic pressure is supplied from the hydraulic pressure supply adjustment mechanism 28 to the exhaust variable valve mechanism 27 corresponds to a second exhaust operation state in which movement of the low-lift exhaust cams 23 for homogeneous charge compression ignition (HCCI) combustion is transmitted to the exhaust valves 17A and 17B.

The intake camshaft 19, the two low-lift intake cams 21, the high-lift intake cam 22, the two low-lift intake cam levers 25A, and the high-lift intake cam lever 25B shown in FIGS. 1B and 2A form an intake variable valve mechanism 29, which has the same structure as the exhaust variable valve mechanism 27. The high-lift intake cam lever 25B can be disconnected from the low-lift intake cam levers 25A. The intake variable valve mechanism 29 can be supplied with hydraulic pressure from the hydraulic pressure supply adjustment mechanism 28. When the intake variable valve mechanism 29 is supplied with hydraulic pressure from the hydraulic pressure supply adjustment mechanism 28, the high-lift intake cam lever 25B is connected to the low-lift intake cam levers 25A. As a result, the high-lift intake cam lever 25B is driven by the high-lift intake cam 22. In FIG. 2B, curve E1 indicates one example of the operation state of the intake valves 16A and 16B (changes in the valve lift amount from the opening timing to the closing timing) when the high-lift intake cam lever 25B is driven in a state in which the high-lift intake cam level 25B is connected to the low-lift intake cam levers 25A. The state in which the intake variable valve mechanism 29 is supplied with hydraulic pressure from the hydraulic pressure supply adjustment mechanism 28 corresponds to a first intake operation state in which movement of the high-lift intake cam 22 for SI combustion is transmitted to the intake valves 16A and 16B.

When the supply of hydraulic pressure from the hydraulic pressure supply adjustment mechanism 28 to the intake variable valve mechanism 29 is stopped, the high-lift intake cam lever 25B is disconnected from the low-lift intake cam levers 25A. As a result, the high-lift intake cam lever 25B becomes free, and the low-lift intake cam levers 25A are driven by the low-lift intake cams 21. In FIG. 2C, curve E2 indicates one example of the operation state of the intake valves 16A and 16B (changes in the valve lift amount from the opening timing to the closing timing) when the low-lift intake cam levers 25A are driven in a state in which the high-lift intake cam lever 25B is disconnected from the low-lift exhaust cam levers 26A. The state in which hydraulic pressure is supplied from the hydraulic pressure supply adjustment mechanism 28 to the intake variable valve mechanism 29 corresponds to a second intake operation state in which movement of the low-lift intake cams 21 for HCCI combustion is transmitted to the intake valves 16A and 16B.

The control computer C controls the hydraulic pressure supply adjustment mechanism 28.

As shown in FIG. 2A, a hydraulic intake variable valve timing mechanism 31 known in the art (hereafter referred to as an intake VVT 31) is arranged at a basal portion of the intake camshaft 19. A hydraulic exhaust variable valve timing mechanism 32 (hereafter referred to as exhaust VVT 32), which is known in the art, is arranged at a basal portion of the exhaust camshaft 20. The intake VVT 31 transmits rotational drive force of the crankshaft 14 to the intake camshaft 19. The intake VVT 31 also changes the rotational phase of the intake camshaft 19 relative to the crankshaft 14 with hydraulic pressure. The exhaust VVT 32 transmits rotational drive force of the crankshaft 14 to the exhaust camshaft 20. The exhaust VVT 32 also changes the rotational phase of the exhaust camshaft 20 relative to the crankshaft 14 with hydraulic pressure.

A hydraulic pressure supply adjustment mechanism 30S is connected to the intake VVT 31 by a hydraulic pressure passage. A hydraulic pressure supply adjustment mechanism 30E is connected to the exhaust VVT 32 by a hydraulic pressure passage. The hydraulic pressure supply adjustment mechanism 30S controls the operation of the intake VVT 31, which adjusts the rotational phase of the intake camshaft 19. The hydraulic pressure supply adjustment mechanism 30E controls the operation of the exhaust VVT 32, which adjusts the rotational phase of the exhaust camshaft 20. The control computer C controls the hydraulic pressure supply adjustment mechanisms 30S and 30E.

As shown in FIG. 1A, an ejection nozzle 34 is connected to an intake passage 33, which is connected to the intake ports 151A and 151B. The ejection nozzle 34 is connected to a fuel supply (not shown) by a fuel supply passage 35 and an electromagnetic flow amount control valve 36. Natural gas is used as fuel. The ejection nozzle 34 ejects fuel into the intake passage 33. The control computer C controls the flow amount control valve 36.

A throttle valve 37 is arranged in the intake passage 33 upstream from the ejection nozzle 34. The open degree of the throttle valve 37 is changed by an electric motor 371. The electric motor 37 is controlled by the control computer C. The throttle valve 37 limits the amount of air drawn via an air cleaner 39 into the intake passage 33. That is, the throttle valve 37 regulates the intake amount. Fuel ejected from the ejection nozzle 34 mixes with the air drawn into the intake passage 33. The air-fuel mixture is drawn into the combustion chamber 112 when the intake ports 151A and 151B open as the piston 12 moves from the top dead center to the bottom dead center. The air-fuel mixture drawn into the combustion chamber 112 is compressed when the exhaust ports 152A and 152B close as the piston 12 moves from the bottom dead center to the top dead center.

The open degree of the throttle valve 37 is detected by a throttle opening detector 38. Information on the throttle open degree detected by the throttle opening detector 38 is transmitted to the control computer C.

A drive state detector 40, a crank angle detector 41, and an airflow meter 42 are electrically connected to the control computer C. The drive state detector 40 sends information indicating a required engine load F (throttle open degree in the present embodiment) and an engine speed N to the control computer C. The control computer C controls the electric motor 371, the flow amount control valve 36, the hydraulic pressure supply adjustment mechanisms 28, 30S, and 30E, and the spark plug 18 in accordance with the received information of the engine load F and the engine speed N. The control computer C calculates the engine speed based on information on the crank angle detected by the crank angle detector 41. The airflow meter 42, which functions as an intake amount detector, sends information on the detected intake amount to the control computer C.

Figure 4:
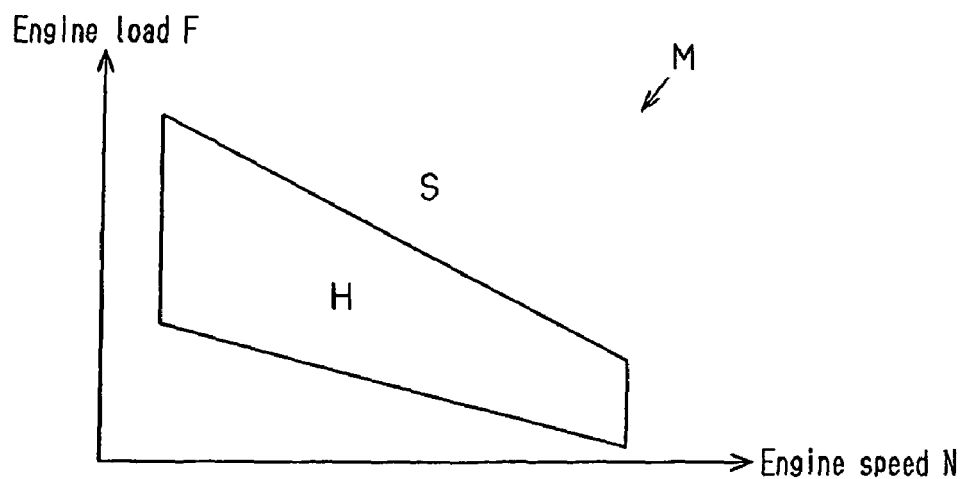
FIG. 4 is a graph showing an engine drive range in which HCCI combustion can be performed.

The control computer C stores a map M shown in FIG. 4, which is defined by the engine load F and the engine speed N. The control computer C determines whether the coordinate of the engine load F and the engine speed N, which is hereafter referred to as the coordinates (F, N), input from the drive state detector 40, is included in range S or range H of the map M. The coordinates (F, N) are input at every crank angle of 360 degrees. The range S is the range in which the mixture in the combustion chamber 112 is burned by igniting the spark plug 18, and range H is the range in which compression-ignited combustion can be performed.

When the exhaust variable valve mechanism 27 and the intake variable valve mechanism 29 are functioning normally and the coordinates (F, N) are included in range S, the control computer C controls the hydraulic pressure supply adjustment mechanism 28 so as to supply hydraulic pressure and also controls the spark plug 18 so as to ignite at a predetermined timing. In other words, spark-ignited combustion (hereafter referred to as "SI combustion") is performed when the coordinates (F, N) are included in range S. When the hydraulic pressure supply adjustment mechanism 28 is controlled to supply hydraulic pressure, the swinging of the high-lift exhaust cam lever 26B, which is based on the cam profile of the high-lift exhaust cam 24, is transmitted to the exhaust valves 17A and 17B. The exhaust valves 17A and 17B open and close in the operation state D1 shown in FIG. 2B. The high-lift exhaust cam 24 is used to perform SI combustion. The swinging of the high-lift intake cam lever 25B, which is based on the cam profile of the high-lift intake cam 22, is transmitted to the intake valves 16A and 16B, and the intake valves 16A and 16B open and close in the operation state El shown in FIG. 2B. The high-lift intake cam 22 is used to perform SI combustion.

When the exhaust variable valve mechanism 27 and the intake variable valve mechanism 29 are functioning normally and the coordinates (F, N) are included in range H, the control computer C controls the hydraulic pressure supply adjustment mechanism 28 so as to supply hydraulic pressure without igniting the spark plug 18. In other words, compression-ignited, or homogeneous charge compression ignition combustion (hereafter referred to as "HCCI combustion"), is performed when the coordinates (F, N) are included in range H. When the hydraulic pressure supply adjustment mechanism 28 is controlled so that the supply of hydraulic pressure is suspended, the swinging of the low-lift exhaust cam levers 26A, which is based on the cam profile of the low-lift exhaust cams 23, is transmitted to the exhaust valves 17A and 17B. This opens and closes the exhaust valves 17A and 17B in the operation state D2 shown in FIG. 2C. The low-lift exhaust cams 23 are used to perform HCCI combustion. The swinging of the low-lift intake cam levers 25A, which is based on the cam profile of the low-lift intake cams 21, is transmitted to the intake valves 16A and 16B, and the intake valves 16A and 16B open and close in the operation state E2 shown in FIG. 2C. The low-lift intake cams 21 are used to perform HCCI combustion.

Figure 7:
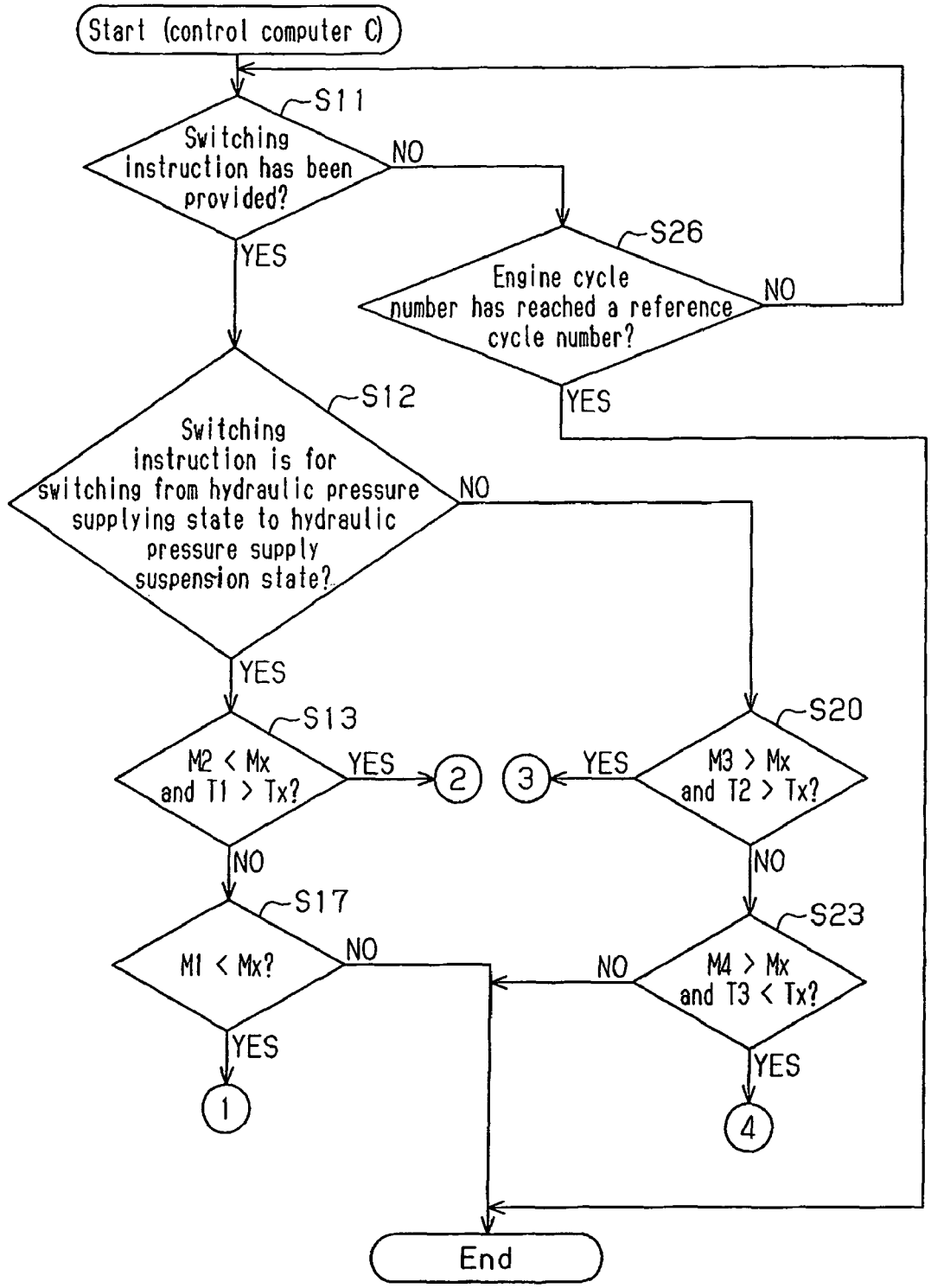
FIGS. 7 and 8 are flowcharts each illustrating a failure diagnosis program.
Figure 8:
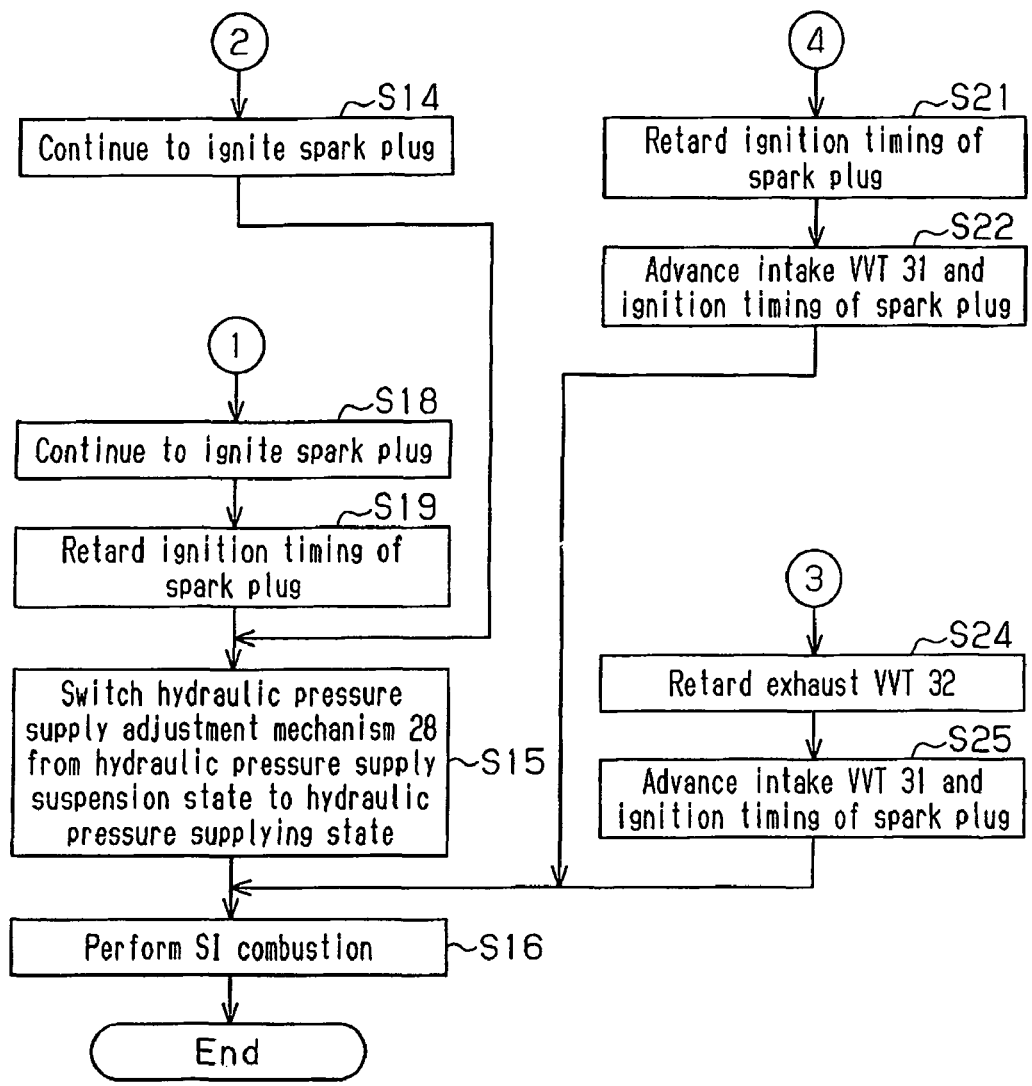

FIG. 6 is a flowchart illustrating a switch control program for controlling the switching between SI combustion and HCCI combustion. FIGS. 7 and 8 are flowcharts each illustrating a failure diagnosis program for diagnosing the exhaust variable valve mechanism 27 or the intake variable valve mechanism 29 to determine whether a failure has occurred in the mechanism. The control computer C executes the switching control based on the switch control program illustrated by the flowchart of FIG. 6 and executes the failure diagnosis control based on the failure diagnosis program illustrated by the flowcharts of FIGS. 7 and 8. The switch control will first be discussed with reference to the flowchart of FIG. 6.

The control computer C determines whether the coordinates (F, N) are included in range S in step S1. When the coordinates (F, N) are not in range S, the control computer C determines whether the coordinates (F, N) used in the previous cycle (hereafter referred to as "previous coordinates (F, N)") are in range S in step S2. When the previous coordinates (F, N) are not in range S, the control computer C proceeds to step S6.

When the previous coordinates (F, N) are in range S, the control computer C instructs the hydraulic pressure supply adjustment mechanism 28 to switch from the hydraulic pressure supplying state to the hydraulic pressure supply suspension state in step S3. Based on this switching instruction, the hydraulic pressure supply adjustment mechanism 28 is switched from the hydraulic pressure supplying state to the hydraulic pressure supply suspension state.

When the coordinates (F, N) are in range S in step S1, the control computer C determines whether the previous coordinates (F, N) are in range H in step S4. When the previous coordinates (F, N) are not in range H, the control computer C proceeds to step S6.

When the previous coordinates (F, N) are in range H, the control computer C instructs the hydraulic pressure supply adjustment mechanism 28 to switch from the hydraulic pressure supply suspension state to the hydraulic pressure supplying state in step S5. Based on this switching instruction, the hydraulic pressure supply adjustment mechanism 28 is switched from the hydraulic pressure supply suspension state to the hydraulic pressure supplying state.

When the previous coordinates (F, N) are not in range S in step S2 or when the previous coordinates (F, N) are not in range H in step S4, the control computer C determines, in step S6, whether a predetermined time (for example several ten microseconds) has elapsed from the start of the processing of step S1. When the predetermined time has not yet elapsed, the control computer C proceeds to step S1. When the predetermined time has elapsed, the control computer C temporarily terminates the current control cycle, and proceeds to step S1 to start a new control cycle.

The failure diagnosis control will now be discussed with reference to the flowcharts of FIGS. 7 and 8.

The control computer C determines whether a switching instruction has been provided in step S11. When no switching instruction has been provided, the control computer C determines, in step S26, whether the engine cycle number has reached a reference cycle number (one revolution of the engine crankshaft corresponds to one cycle) after the start of the processing of step S11. The reference cycle number is set in accordance with the engine speed. When the engine cycle number has not yet reached the reference cycle number, the control computer C proceeds to step S11.

When a switching instruction has been provided in step S11, the control computer C determines whether a failure has occurred in the intake variable valve mechanism 29 and the exhaust variable valve mechanism 27 based on information on changes in the intake amount detected by the airflow meter 42.

Figure 5A:
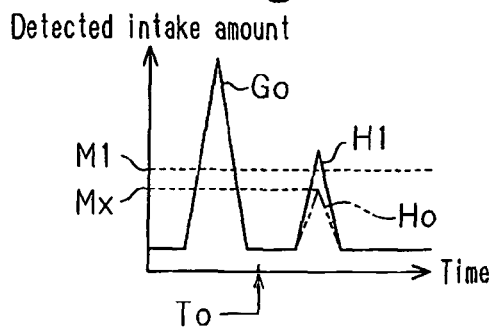
FIG. 5A is a graph exemplifying changes in the intake amount observed when a failure has occurred in the exhaust variable valve mechanism at the time of switching from SI combustion to HCCI combustion.
Figure 5E:
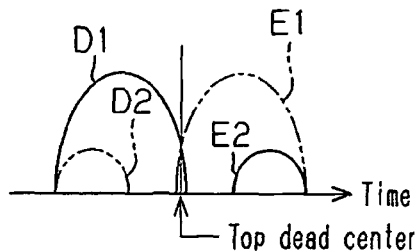
FIG. 5E is a timing chart showing the operation state of the exhaust valve and the intake valve when a failure has occurred in the exhaust variable valve mechanism at the timing of switching from SI combustion to HCCI combustion.
Figure 5B:
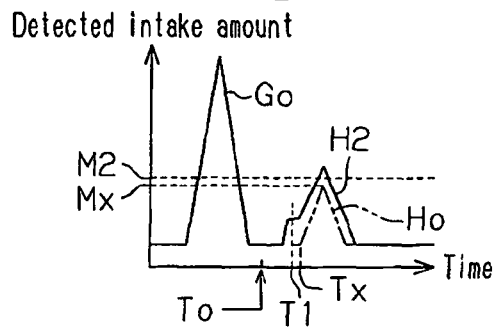
FIG. 5B is a graph exemplifying changes in the intake amount observed when a failure has occurred in the intake variable valve mechanism at the time of switching from SI combustion to HCCI combustion.
Figure 5F:
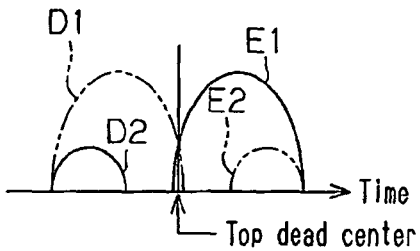
FIG. 5F is a timing chart showing the operation state of the exhaust valve and the intake valve when a failure has occurred in the intake variable valve mechanism at the timing of switching from SI combustion to HCCI combustion.
Figure 5C:
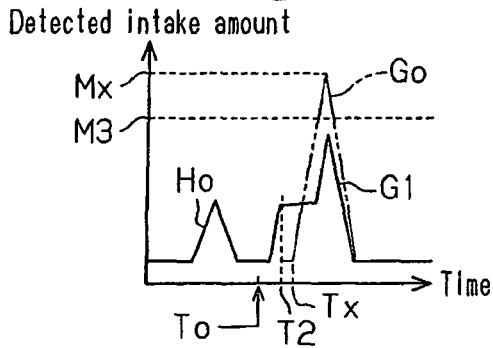
FIG. 5C is a graph exemplifying changes in the intake amount observed when a failure has occurred in the exhaust variable valve mechanism at the time of switching from HCCI combustion to SI combustion.
Figure 5G:
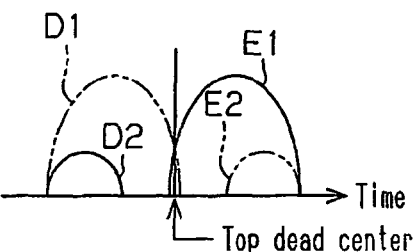
FIG. 5G is a timing chart showing the operation state of the exhaust valve and the intake valve when a failure has occurred in the exhaust variable valve mechanism at the timing of switching from HCCI combustion to SI combustion.
Figure 5D:
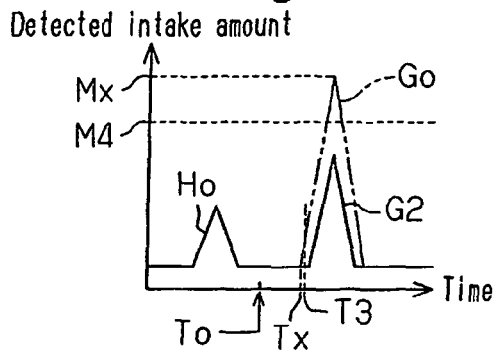
FIG. 5D is a graph exemplifying changes in the intake amount observed when a failure has occurred in the intake variable valve mechanism at the time of switching from HCCI combustion to SI combustion.

A waveform Go drawn by a solid line in each of the graphs of FIGS. 5A and 5B and a waveform Go drawn by a broken line in each of the graphs of FIGS. 5C and 5D indicate changes in the intake amount detected by the airflow meter 42 when no abnormality has occurred in the intake variable valve mechanism 29 and the exhaust variable valve mechanism 27 while SI combustion is being performed. In FIGS. 5A to 5D, the horizontal axis represents time, and the vertical axis represents the detected intake amount. A timing To indicates the timing at which the hydraulic pressure supply adjustment mechanism 28 is switched from the hydraulic pressure supplying state to the hydraulic pressure supply suspension state or from the hydraulic pressure supply suspension state to the hydraulic pressure supplying state.

A waveform Ho drawn by a broken line in each of the graphs of FIGS. 5A and 5B and a waveform Ho drawn by a solid line in each of the graphs of FIGS. 5C and 5D indicate changes in the intake amount detected by the airflow meter 42 when no abnormality has occurred in the intake variable valve mechanism 29 and the exhaust variable valve mechanism 27 while HCCI combustion is being performed.

A waveform H1 in the graph of FIG. 5A indicates one example of changes in the intake amount detected by the airflow meter 42 when an abnormality occurs in the exhaust variable valve mechanism 27 during switching of the hydraulic pressure supply adjustment mechanism 28 from the hydraulic pressure supplying state to the hydraulic pressure supply suspension state, that is, from SI combustion to HCCI combustion. In the abnormality occurring in the exhaust variable valve mechanism 27 in FIG. 5A, even though the hydraulic pressure supply adjustment mechanism 28 is switched from the hydraulic pressure supplying state to the hydraulic pressure supply suspension state, the exhaust valves 17A and 17B are not driven in the operation state D2 based on the cam profile of the low-lift exhaust cams 23 and are driven instead in the operation state D1 based on the cam profile of the high-lift exhaust cam 24.

Curves D1 and E2 drawn by solid lines in the timing chart of FIG. 5E indicate the operation states of the exhaust valves 17A and 17B and the intake valves 16A and 16B in the abnormal state shown in FIG. 5A. In such an abnormal state, the internal EGR is not performed. As a result, the intake valves 16A and 16B are open when the combustion chamber 112 is in a negative pressure state as the piston 12 moves from the top dead center to the bottom dead center. In this case, the intake air is heated by adiabatic compression. As a result, the intake amount increases excessively in HCCI combustion. This causes overly advanced ignition. The "internal EGR" refers to the process of enclosing some of the burned gas in the combustion chamber 112 by closing the exhaust valves during the exhaust stroke, and mixing the burned gas enclosed in the combustion chamber 112 with new air that is supplied into the combustion chamber 112 in the next combustion cycle.

A waveform H2 in the graph of FIG. 5B indicates one example of changes in the intake amount detected by the airflow meter 42 when an abnormality occurs in the intake variable valve mechanism 29 during switching of the hydraulic pressure supply adjustment mechanism 28 from the hydraulic pressure supplying state to the hydraulic pressure supply suspension state, that is, from SI combustion to HCCI combustion. In the abnormality occurring in the intake variable valve mechanism 29, even though the hydraulic pressure supply adjustment mechanism 28 is switched from the hydraulic pressure supplying state to the hydraulic pressure supply suspension state, the intake valves 16A and 16B are not driven in the operation state E2 based on the cam profile of the low-lift intake cams 21 and are driven instead in the operation state E1 based on the cam profile of the high-lift intake cam 22.

Curves D2 and E1 drawn by solid lines in the timing chart of FIG. 5F indicate the operation states of the exhaust valves 17A and 17B and the intake valves 16A and 16B in the abnormal state shown in FIG. 5B. In such an abnormal state, the exhaust gas that has been enclosed in the combustion chamber 112 by performing the internal EGR is first returned to the intake passage 33 from the combustion chamber 112 and is then re-circulated into the combustion chamber 112. This advances the intake air increase initiation timing in HCCI combustion. As a result, the temperature in the combustion chamber 112 decreases and combustion becomes unstable.

When a switching instruction has been provided in step S11 of FIG. 7, the control computer C determines whether the switching instruction is for switching from the hydraulic pressure supplying state to the hydraulic pressure supply suspension state in step S12. When the switching instruction is for switching from the hydraulic pressure supplying state to the hydraulic pressure supply suspension state, the control computer C compares an intake amount maximum value Mx detected at or after the timing To at which the hydraulic pressure supply adjustment mechanism 28 is switched from the hydraulic pressure supplying state to the hydraulic pressure supply suspension state with a predetermined reference maximum value M2 and also compares an intake amount increase initiation timing Tx detected at or after the timing To with a predetermined reference initiation timing T1 in step S13. The processing in step S13 is performed to determine whether a failure has occurred in the intake variable valve mechanism 29 during switching from SI combustion to HCCI combustion. When M2≧Mx or T1≦Tx is satisfied, the control computer C determines that no failure has occurred in the intake variable valve mechanism 29. When M2<Mx and T1>Tx are both satisfied, the control computer C determines that a failure has occurred in the intake variable valve mechanism 29. The reference maximum value M2 is a first reference maximum value, which serves as first reference change information. The reference initiation timing T1 is a first reference initiation timing, which serves as first reference change information.

When M2≧Mx or T1≦Tx is satisfied, the control computer C compares the intake amount maximum value Mx detected at or after the timing To with a predetermined reference maximum value M1 (>M2) in step S17. The processing in step S17 is performed to determine whether a failure has occurred in the exhaust variable valve mechanism 27 during switching from SI combustion to HCCI combustion. When M1≧Mx is satisfied, the control computer C determines that no failure has occurred in the exhaust variable valve mechanism 27. When M1≦Mx is satisfied, the control computer C determines that a failure has occurred in the exhaust variable valve mechanism 27. The reference maximum value M1 is a first reference maximum value, which serves as first reference change information.

When M1≧Mx is satisfied, the control computer C proceeds to step S11 to start a new control cycle.

When M1<Mx is satisfied, the control computer C continues to ignite the spark plug 18 in step S18. The continued ignition of the spark plug 18 assists HCCI combustion and prevents abnormal combustion and misfiring. The control computer C retards the ignition timing of the spark plug 18 in step S19. The retarded ignition timing of the spark plug 18 prevents the engine from igniting at an overly advanced timing. Subsequently, the control computer C switches the hydraulic pressure supply adjustment mechanism 28 from the hydraulic pressure supply suspension state to the hydraulic pressure supplying state in step S15.

After the processing in step S15, the control computer C performs SI combustion in step S16.

When M2<Mx and T1>Tx are both satisfied in step S13, the control computer C continues to ignite the spark plug 18 in step S14. The continued ignition of the spark plug 18 assists HCCI combustion and prevents abnormal combustion and misfiring. Subsequently, the control computer C switches the hydraulic pressure supply adjustment mechanism 28 from the hydraulic pressure supply suspension state to the hydraulic pressure supplying state in step S15.

After the processing in step S15, the control computer C performs SI combustion in step S16.

After the processing in step S16, the control computer C proceeds to step S11 to start a new control cycle.

When the switching instruction instructs to switch from the hydraulic pressure supply suspension state to the hydraulic pressure supplying state in step S12, the control computer C determines whether an abnormality has occurred in the intake variable valve mechanism 29 and the exhaust variable valve mechanism 27. The control computer C determines whether an abnormality has occurred in the intake variable valve mechanism 29 or the exhaust variable valve mechanism 27 based on information on changes in the intake amount detected by the airflow meter 42.

A waveform G1 shown in the graph of FIG. 5C indicates one example of changes in the intake amount detected by the airflow meter 42 when an abnormality has occurred in the exhaust variable valve mechanism 27 at the time of switching of the hydraulic pressure supply adjustment mechanism 28 from the hydraulic pressure supply suspension state to the hydraulic pressure supplying state, that is, from HCCI combustion to SI combustion. As the abnormality occurring in the exhaust variable valve mechanism 27 in FIG. 5C, the exhaust valves 17A and 17B fail to be driven in the operation state D1 based on the cam profile of the high-lift exhaust cam 24 but are driven in the operation state D2 based on the cam profile of the low-lift exhaust cams 23 although the hydraulic pressure supply adjustment mechanism 28 is switched from the hydraulic pressure supply suspension state to the hydraulic pressure supplying state.

Curves D2 and E1 drawn by solid lines in the timing chart of FIG. 5G indicate the operation states of the exhaust valves 17A and 17B and the intake valves 16A and 16B in the abnormal state shown in FIG. 5C. In such an abnormal state, the exhaust gas in the combustion chamber 112 is first returned to the intake passage 33 by the internal EGR and then re-circulated into the combustion chamber 112. In this case, the returned exhaust gas advances the intake amount increase initiation timing in SI combustion. Further, the intake air heated by the internal EGR may cause ignition and knocking.

A waveform G2 in the graph of FIG. 5D indicates one example of changes in the intake amount detected by the airflow meter 42 when an abnormality occurs in the intake variable valve mechanism 29 during switching of the hydraulic pressure supply adjustment mechanism 28 from the hydraulic pressure supply suspension state to the hydraulic pressure supplying state, that is, from HCCI combustion to SI combustion.

Figure 5H:
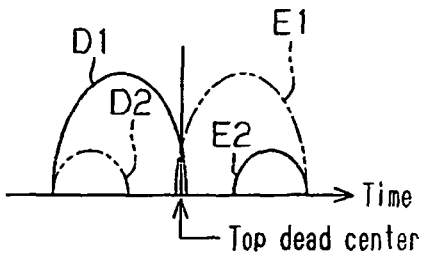
FIG. 5H is a timing chart showing the operation state of the exhaust valve and the intake valve when a failure has occurred in the intake variable valve mechanism at the timing of switching from HCCI combustion to SI combustion.

Curves D1 and E2 drawn by solid lines in the timing chart of FIG. 5H indicate the operation state of the exhaust valves 17A and 17B and the intake valves 16A and 16B in the abnormal state shown in FIG. 5D. In such an abnormal state, the opening timing of the intake valves in SI combustion is retarded. As a result, the intake amount decreases.

When the switching instruction is for switching from the hydraulic pressure supply suspension state to the hydraulic pressure supplying state in step S12, the control computer C compares, in step S20, an intake amount maximum value Mx detected at or after the timing To at which the hydraulic pressure supply adjustment mechanism 28 is switched from the hydraulic pressure supply suspension state to the hydraulic pressure supplying state in FIGS. 5C and 5D with a predetermined reference maximum value M3. Further, the control computer C compares an intake amount increase initiation timing Tx detected at or after the timing To with a predetermined reference start time T2. The processing in step S20 is performed to determine whether a failure has occurred in the exhaust variable valve mechanism 27 during switching from HCCI combustion to SI combustion. When M3≦Mx or T2≦Tx is satisfied, the control computer C determines that no failure has occurred in the exhaust variable valve mechanism 27. When M3>Mx and T2>Tx are both satisfied, the control computer C determines that a failure has occurred in the exhaust variable valve mechanism 27. The reference maximum value M3 is a second reference maximum value, which serves as second reference change information. The reference initiation timing T2 is a second reference initiation timing, which serves as second reference change information.

When M3≦Mx or T2≦Tx is satisfied, the control computer C compares the intake amount maximum value Mx detected at or after the timing To with a predetermined reference maximum value M4 in step S23. The control computer C also compares the intake amount increase initiation timing Tx detected at or after the timing To with a predetermined reference initiation timing T3. The processing in step S23 is performed to determine whether a failure has occurred in the intake variable valve mechanism 29 during switching from HCCI combustion to SI combustion. When M4≦Mx or T3≧Tx is satisfied, the control computer C determines that no failure has occurred in the intake variable valve mechanism 29. When M4>Mx and T3<Tx are both satisfied, the control computer C determines that a failure has occurred in the intake variable valve mechanism 29. The reference maximum value M4 is a second reference maximum value, which serves as second reference change information. The reference initiation timing T3 is a second reference initiation timing, which serves as second reference change information.

When M4≦Mx or T3≧Tx, the control computer C proceeds to step S11 to start a new control cycle.

When M4>Mx and T3<Tx are both satisfied, the control computer C retards the ignition timing of the spark plug 18 in step S21. The ignition of the spark plug 18 assists HCCI combustion and prevents abnormal combustion and misfiring. The retarded ignition timing of the spark plug 18 prevents overly advanced ignition. Subsequently, the control computer C advances the intake VVT 31 and the ignition timing of the spark plug 18 in step S22. The advancement of the intake VVT 31 and ignition timing of the spark plug 18 reduces the heating of the intake air. The advancement of the intake VVT 31 refers to advancement of the opening timing and the closing timing of the intake valves 16A and 16B. The processing in step S22 is performed until fluctuations in the engine speed caused by differences in the torque values between cylinders converges within a tolerable range.

The control compute C subsequently performs SI combustion in step S16.

When M3>Mx and T2>Tx are both satisfied in step S20, the control computer C retards the exhaust WT 32 in step S24, that is, retards the opening timing and the closing timing of the exhaust valves 17A and 17B. The exhaust VVT 32 is retarded to reduce the amount of exhaust gas enclosed into the combustion chamber 112 and reduce the amount of exhaust gas in the combustion chamber 112 returned to the intake passage 33. Reduction in the amount of exhaust gas returned to the intake passage 33 prevents the intake amount from decreasing. Also, in step S25, the control computer C advances the intake VVT 31 and the ignition timing of the spark plug 18. In this case, the intake VVT 31 is advanced side so that the exhaust variable valve mechanism 27 performs internal EGR in the other cylinders that are operating normally. The ignition timing of the spark plug 18 is advanced to enable stable combustion.

The control compute C subsequently performs SI combustion in step S16.

After the processing in step S16, the control computer C proceeds to step S11 to start a new control cycle.

The control computer C functions as a determination unit that determines whether a failure has occurred in the intake VVT 31 and the exhaust VVT 32 based on information on changes in the intake amount detected by the airflow meter 42 (intake amount detector). The control computer C also functions as a control unit that executes backup combustion control intended for failure cases when the determination unit determines that a failure has occurred in the intake VVT 31 or the exhaust VVT 32.

The first embodiment has the advantages described below.

(1) When a failure has occurred in the exhaust variable valve mechanism 27, the intake amount maximum value Mx, detected at or after the timing To at which the hydraulic pressure supply adjustment mechanism 28 is switched from the hydraulic pressure supplying state to the hydraulic pressure supply suspension state, is greater than the reference maximum value M1. Thus, when determining that the intake amount maximum value Mx, detected at or after the timing To at which the hydraulic pressure supply adjustment mechanism 28 is switched from the hydraulic pressure supplying state to the hydraulic pressure supply suspension state, is greater than the reference maximum value M1, the control computer C determines that a failure has occurred in the exhaust variable valve mechanism 27.

Based on this determination, the control computer C continues to ignite the spark plug 18, retards the ignition timing of the spark plug 18, and returns the hydraulic pressure supply adjustment mechanism 28 to the hydraulic pressure supplying state from the hydraulic pressure supply suspension state. Thus, even when a failure occurs in the exhaust variable valve mechanism 27 during switching from SI combustion to HCCI combustion, the spark ignition assists HCCI combustion to prevent overly advanced ignition. This prevents abnormal combustion and misfiring.

(2) When a failure occurs in the intake variable valve mechanism 29, the intake amount maximum value Mx, detected at or after the timing To at which the hydraulic pressure supply adjustment mechanism 28 is switched from the hydraulic pressure supplying state to the hydraulic pressure supply suspension state, is greater than the reference maximum value M2. Further, the intake amount increase initiation timing Tx, detected at or after the timing To, is advanced from the reference initiation timing T1. Thus, when determining that the intake amount maximum value Mx, detected at or after the timing To at which the hydraulic pressure supply adjustment mechanism 28 is switched from the hydraulic pressure supplying state to the hydraulic pressure supply suspension state, is greater than the reference maximum value M2 and the intake amount increase initiation timing Tx, detected at or after the timing To, is advanced from the reference initiation timing T1, the control computer C determines that a failure has occurred in the intake variable valve mechanism 29.

Based on this determination, the control computer C continues to ignite the spark plug 18 and returns the hydraulic pressure supply adjustment mechanism 28 to the hydraulic pressure supplying state from the hydraulic pressure supply suspension state. Thus, even when a failure occurs in the intake variable valve mechanism 29 during switching from SI combustion to HCCI combustion, the spark ignition assists HCCI combustion and prevents abnormal combustion and misfiring.

The determination using the predetermined reference maximum value M2 and the predetermined reference initiation timing T1 effectively avoids erroneous determination of failures in the intake variable valve mechanism 29.

(3) When a failure occurs in the exhaust variable valve mechanism 27, the intake amount maximum value Mx detected at or after the timing To at which the hydraulic pressure supply adjustment mechanism 28 is switched from the hydraulic pressure supply suspension state to the hydraulic pressure supplying state is less than the reference maximum value M3. Further, the intake amount increase initiation timing Tx, detected at or after the timing To, is advanced from the reference initiation timing T2. Thus, when determining that the intake amount maximum value Mx, detected at or after the timing To at which the hydraulic pressure supply adjustment mechanism 28 is switched from the hydraulic pressure supply suspension state to the hydraulic pressure supplying state, is less than the reference maximum value M3 and the intake amount increase initiation timing Tx, detected at or after the timing To, is advanced from the reference initiation timing T2, the control computer C determines that a failure has occurred in the exhaust variable valve mechanism 27.

Based on this determination, the control computer C retards the exhaust VVT 32 and advances the intake VVT 31 and ignition timing of the spark plug 18. Retardation of the opening and closing timings of the exhaust valves 17A and 17B reduces the internal EGR amount. Advancement of the opening and closing timings of the intake valves 16A and 16B allows a small amount of internal EGR gas to be drawn into the other combustion chambers 112 to create the same environment in the other combustion chambers 112. Advancement of the spark ignition timing prevents unstable flame propagation combustion that would be caused by an increase in the EGR amount. Thus, the intake amount is prevented from decreasing, the internal EGR is performed in the other cylinders that are operating normally, combustion is stabilized, and abnormal combustion and misfiring are prevented even when a failure occur in the exhaust variable valve mechanism 27 during switching from HCCI combustion to SI combustion.

The determination using the predetermined reference maximum value M3 and the predetermined reference initiation timing T2 effectively avoids erroneous determination of failures in the exhaust variable valve mechanism 27.

(4) When a failure occurs in the intake variable valve mechanism 29, the intake amount maximum value Mx, detected at or after the timing To at which the hydraulic pressure supply adjustment mechanism 28 is switched from the hydraulic pressure supply suspension state to the hydraulic pressure supplying state, is less than the reference maximum value M4, and the intake amount increase initiation timing Tx, detected at or after the timing To, is retarded from the reference initiation timing T3. Thus, when determining that the intake amount maximum value Mx, detected at or after the timing To at which the hydraulic pressure supply adjustment mechanism 28 is switched from the hydraulic pressure supply suspension state to the hydraulic pressure supplying state, is less than the reference maximum value M4 and the intake amount increase initiation timing Tx detected at or after the timing To is retarded from the reference initiation timing T3, the control computer C determines that a failure has occurred in the intake variable valve mechanism 29.

Based on this determination, the control computer C retards the ignition timing of the spark plug 18 and advances the intake VVT 31 and ignition timing of the spark plug 18. When a failure occurs in the intake variable valve mechanism 29, the intake valves 16A and 16B opened when the combustion chamber 112 is in a negative pressure state as the piston 12 moves from the top dead center to the bottom dead center. In this case, the intake air is heated by adiabatic compression. Retardation of the spark ignition timing prevents ignition-assisted combustion, such as spark ignition and self ignition caused by heat (heated intake air) in the combustion chamber 112. Advancement of the opening and closing timings of the intake valves 16A and 16B and advancement of temporarily retarded spark ignition timings reduces the heating of the intake air. This prevents abnormal combustion and misfiring even when a failure occurs in the intake variable valve mechanism 29 during switching from HCCI combustion to SI combustion.

The determination using the predetermined reference maximum value M4 and the predetermined reference initiation timing T3 effectively avoids erroneous determination of failures in the intake variable valve mechanism 29.

It should be apparent to those skilled in the art that the present invention may be embodied in many other specific forms without departing from the spirit or scope of the invention. Particularly, it should be understood that the present invention may be embodied in the following forms.

In the preferred embodiment, the determination of a failure may be performed by only comparing the intake amount maximum value and the reference maximum value.

In the preferred embodiment, the determination of a failure may be performed by only comparing the increase initiation timing and the reference timing.

When the failure diagnosis apparatus determines that a failure has occurred, the apparatus may generate an alarm indicating that the failure.

The present examples and embodiments are to be considered as illustrative and not restrictive, and the invention is not to be limited to the details given herein, but may be modified within the scope and equivalence of the appended claims.

The invention claimed is:

1. A failure diagnosis apparatus for a homogeneous charge compression ignition engine having combustion modes switchable between compression-ignited combustion, which is performed together with internal EGR, and spark-ignited combustion, wherein the engine includes an intake variable valve mechanism for varying an operation state of an intake valve and an exhaust variable valve mechanism for varying an operation state of an exhaust valve, the intake variable valve mechanism includes an intake camshaft, an intake cam for spark-ignited combustion fixed to the intake camshaft, and an intake cam for compression-ignited combustion fixed to the intake camshaft, with the intake variable valve mechanism being switchable between a first intake operation state in which movement of the spark-ignited combustion intake cam is transmitted to the intake valve and a second intake operation state in which movement of the compression-ignited combustion intake cam is transmitted to the intake valve, the exhaust variable valve mechanism includes an exhaust camshaft, an exhaust cam for spark-ignited combustion fixed to the exhaust camshaft, and an exhaust cam for compression-ignited combustion fixed to the exhaust camshaft, with the exhaust variable valve mechanism being switchable between a first exhaust operation state in which movement of the spark-ignited combustion exhaust cam is transmitted to the exhaust valve and a second exhaust operation state in which movement of the compression-ignited combustion exhaust cam is transmitted to the exhaust valve, and the engine further includes an intake variable valve timing mechanism which advances or retards the intake camshaft and an exhaust variable valve timing mechanism which advances or retards the exhaust camshaft, the apparatus comprising:

an intake amount detector which detects the intake amount of a mixture drawn into a combustion chamber of the engine;

a determination unit which determines whether a failure has occurred in the intake variable valve mechanism and the exhaust variable valve mechanism from information on changes in the intake amount detected by the intake amount detector, wherein the determination unit determines whether a failure has occurred from information on switching from the spark-ignited combustion to the compression-ignited combustion, information on changes in the intake amount, and predetermined first reference change information, and the determination unit determines whether a failure has occurred from information on switching from the compression-ignited combustion to the spark-ignited combustion, information on changes in the intake amount, and predetermined second reference change information; and a control unit which executes backup combustion control when the determination unit determines that a failure has occurred.

2. The failure diagnosis apparatus according to claim 1, wherein the determination unit determines whether a failure has occurred in the exhaust variable valve mechanism by comparing a maximum value of the intake amount detected after switching from the spark-ignited combustion to the compression-ignited combustion with a predetermined first reference maximum value.

3. The failure diagnosis apparatus according to claim 1, wherein the determination unit determines whether a failure has occurred in the intake variable valve mechanism by comparing an increase initiation timing of the intake amount detected after switching from the spark-ignited combustion to the compression-ignited combustion with a predetermined first reference initiation timing.

4. The failure diagnosis apparatus according to claim 3, wherein the determination unit determines whether a failure has occurred in the intake variable valve mechanism by comparing a maximum value of the intake amount detected after the increase initiation timing with a predetermined first reference maximum value in addition to comparing the increase initiation timing with the first reference initiation timing.

5. The failure diagnosis apparatus according to claim 1, wherein the determination unit determines whether a failure has occurred in the exhaust variable valve mechanism or the intake variable valve mechanism by comparing an increase initiation timing of the intake amount detected after switching from the compression-ignited combustion to the spark-ignited combustion with a predetermined second reference initiation timing.

6. The failure diagnosis apparatus according to claim 5, wherein the determination unit determines whether a failure has occurred in the exhaust variable valve mechanism or the intake variable valve mechanism by comparing a maximum value of the intake amount detected after the increase initiation timing with a predetermined second reference maximum value in addition to comparing the increase initiation timing with the second reference initiation timing.

7. The failure diagnosis apparatus according to claim 6, wherein the determination unit determines that a failure has occurred in the exhaust variable valve mechanism when the increase initiation timing is advanced from the second reference initiation timing.

8. The failure diagnosis apparatus according to claim 6, wherein the determination unit determines that a failure has occurred in the intake variable valve mechanism when the increase initiation timing is retarded from the second reference initiation timing.

9. The failure diagnosis apparatus according to claim 1, wherein when the determination unit determines that a failure has occurred in the exhaust variable valve mechanism when switching from the spark-ignited combustion to the compression-ignited combustion, the control unit continues spark ignition, retards a spark ignition timing, and returns to the spark-ignited combustion from the compression-ignited combustion.

10. The failure diagnosis apparatus according to claim 1, wherein when the determination unit determines that a failure has occurred in the intake variable valve mechanism when switching from the spark-ignited combustion to the compression-ignited combustion, the control unit continues spark ignition and returns to the spark-ignited combustion from the compression-ignited combustion.

11. The failure diagnosis apparatus according to claim 1, wherein when the determination unit determines that a failure has occurred in the exhaust variable valve mechanism when switching from the compression-ignited combustion to the spark-ignited combustion, the control unit retards the exhaust camshaft to retard opening and closing timings of the exhaust valve, advances the intake camshaft to advance opening and closing timings of the intake valve, and advances a spark ignition timing.

12. The failure diagnosis apparatus according to claim 1, wherein when the determination unit determines that a failure has occurred in the intake variable valve mechanism when switching from the compression-ignited combustion to the spark-ignited combustion, the control unit retards a spark ignition timing, advances the intake camshaft to advance opening and closing timings of the intake valve, and advances a spark ignition timing.

* * * * *